Patented Oct. 17, 1944

2,360,650

UNITED STATES PATENT OFFICE 2,360,650

METHOD OF TREATING PLASTIC SHEETING

Paul W. Crane, Upper Montclair, N. J., assignor to E. I. du Pont de Nemours & Company, Wilmington, Del., a corporation of Delaware No Drawing. Application July 10, 1940, Serial No. 344,704

5 Claims. (Cl. 18—48)

This invention relates to a method of treating plastic sheeting and, more particularly, to the treatment of adhesive interlayer sheeting commonly used in the manufacture of laminated glass.

The type of interlayer sheeting to which the present invention is applicable is that which is relatively pliable and soft and further characterized by having adhesive surfaces. Although these soft and pliable interlayers have outstanding advantages for use in the manufacture of laminated glass, their adhesiveness and tackiness at ordinary temperatures have raised a serious problem in handling and shipping.

In the manufacture and shipment of such interlayer sheeting, the sheeting is either formed into individual sheets which are stacked in piles for handling or shipping, or rolled up on itself on a mandrel in continuous lengths. Even when the interlayer sheeting is not obviously tacky in the ordinary sense of the word, the successive layers of it frequently tend to become stuck together in rolls as the result of a latent adhesiveness which may become effective only under storage conditions involving pressure, resulting from the tension in a tightly wound roll, and under summer temperatures. Such sheeting may conveniently be termed "self-adhesive."

When the interlayer sheeting is not only self-adhesive but actually tacky, a further difficulty arises in the course of assembling it with glass as a step in the manufacture of safety glass. Such sticky and pliable interlayer sheeting cannot, except with great difficulty, be laid out flat on a sheet of glass without trapping air between the interlayer and the glass, and air thus trapped cannot practicably be squeezed out in the course of the subsequent bonding of the interlayer to the glass, because the adhesiveness of the interlayer tends to seal the air bubbles in their initial position, and, further, because the application of high pressures to the glass causes a squeezing out of the interlayer itself from between the glass. It will thus be seen that, even though the difficulty of storage and shipment may be eliminated by using the sheeting without delay at the place of manufacture, the difficulty of assembling it with glass must still be met.

An object of the present invention is to eliminate the difficulties of handling, packing, shipping, and storing self-adhesive and tacky interlayer sheeting comprising an organic plastic either as individual sheets or in continuous lengths. A further object is to provide a practical method of eradicating the tackiness of soft, pliable interlayer sheeting even though there is no necessity for completely eliminating the self-adhesive character thereof. A further object is the provision of means for accomplishing the above-mentioned results without any appreciable increase in the cost of manufacture of the sheeting or in the cost of making laminated safety glass therefrom. A further object is the provision of means for treating tacky and self-adhesive plastic sheeting to overcome the difficulties hereinbefore mentioned without detrimental effect upon the appearance or protective character of the laminated glass made therefrom. Other objects of the invention will be apparent from the description given hereinafter.

The above objects are accomplished according to the present invention by providing smooth and pliable sheeting, comprising an adhesive organic plastic, with a roughened surface obtained by treating the sheeting, while at least the surface layers thereof are under a tensional strain, with a liquid solvent for the sheeting adapted to soften the surfaces thereof, whereby the surfaces are roughened, removing the solvent residue from the surfaces of the sheeting, and drying the sheeting.

More specifically, the present invention provides a process for reducing the adhesiveness of the surfaces of smooth and pliable sheeting comprising polyvinyl butyral resin and a plasticizer therefor, which process comprises treating the sheeting while at least the surface layers thereof are under a tensional strain, created in at least one of its major dimensions, with an aqueous mixture comprising a solvent and plasticizer for the sheetnig adapted to soften the surfaces thereof and prevent a substantial amount of the extraction of the plasticizer therefrom, whereby the surfaces of the sheeting are roughened, bringing the sheeting into contact with an aqueous bath to remove the solvent residue from the surfaces of the sheeting, and drying the sheeting.

The present invention resides in the discovery that the difficulties arising from the tacky and self-adhesive character of the commonly used interlayer sheeting can be eliminated by a roughening of the surfaces of the sheeting. The invention can most conveniently be described as applied to sheeting of the type now commonly used as interlayers of safety glass and comprising a polyvinyl acetal resin, together with plasticizers therefor in such proportion as to make the sheeting self-adhesive or tacky. The process can be applied, however, in an analogous manner to similar self-adhesive and tacky sheeting of other organic plastics such as those of plasticized cellulose acetate, cellulose nitrate, polymethyl methacrylate, and to sheets of certain resins which, even in the absence of plasticizers, are self-adhesive or tacky, such, for example, as polyvinyl acetate.

The step of creating the tensional strain in at least the surface layer of the sheeting in at least one of its major dimensions may be carried out by stretching the sheeting longitudinally, laterally, or both, in the course of its manufacture. For instance, the requisite tensional strain may be imparted to the sheeting as it is extruded from the slit orifice in the course of shaping it, or the stretching may be provided in the course of extracting the solvent from the sheeting subsequent to the shaping, or by seasoning the sheeting under longitudinal or lateral constraint so as to prevent the shrinkage in length or width which normally accompanies such seasoning. It is to be understood that it is not required that the sheeting be subjected to externally-applied tensional stress during its contact with the liquid solvent, but that it shall have been, at some time prior to this contact, subjected to a tensional stress which leaves its surface layer in a condition of tensional strain.

Only a small tensional strain is required, and, in many cases, it will be found that its creation results naturally from the method employed in forming the sheeting. Thus, for example, in a process of forming sheeting by extrusion through a slit orifice, the slight tension applied merely in carrying the sheeting away from the orifice provides sufficient constraint against the tendency of the sheeting to shrink in proportion to its loss of solvent, and, similarly, constraint is provided in the course of carrying the sheeting subsequently through seasoning equipment. Also, in some processes of manufacture of sheeting by extrusion, a lateral tension is applied for a reason independent of the present procedure, and this likewise serves to provide the requisite strained condition.

The direction of this tensional strain ordinarily determines the orientation of the pattern of roughness which is the result of the procedure of this invention. Such orientation is, however, a matter of no practical importance in the subsequent use of the sheeting so processed. The tensional strain is equally effective whether it be longitudinal or lateral in its direction, or, for that matter, directed along a diagonal with resulting longitudinal or lateral components.

In accordance with the present invention, the sheeting thus strained is immersed in or otherwise brought into contact with a solvent for the sheeting which is adapted to soften the surfaces thereof. Conveniently, the solvent may be diluted with a non-solvent for the sheeting which is miscible with the solvent such, for example, as water. Since it is desirable that the sheeting be not made excessively sticky and weak, with a correspondingly strong tendency to adhere to equipment while in its softened condition and to be stretched and torn, and, since the development of such a degree of stickiness is not essential to the success of the procedure, the solvent used will preferably be somewhat diluted with a non-solvent. The solvent mixture used is preferably a mixture of a major portion of an active solvent and a minor portion of water which is capable of softening the surfaces of the sheeting without dissolving it away. The solvent mixture is preferably used at a temperature not above ordinary room temperature.

Those solvents or mixtures of solvents, which either in undiluted form or in admixtures with some water are operative for the purposes of the present invention, will ordinarily possess a solvent action upon the plasticizer contained in the sheeting and, hence, tend to effect some extraction thereof from the sheeting. In order to lessen or prevent this action, it is desirable to add a plasticizer to the solvent before it is used. The presence of water in the solvent mixture tends to set a limit upon the proportion of plasticizer that can be held by the solvent mixture, and the addition of the plasticizer to the solvent mixture, preferably in proportions approximating this limit, reduces or prevents the entry of further amounts of plasticizer into the solvent by extraction from the sheeting. This effect of the presence of water in the solvent mixture is a further reason for selecting water as the non-solvent and for including it in the solvent mixture.

The solubility of plasticizers in mixtures of solvents and water, as well as the likelihood that a given solvent mixture will cause excessive stickiness and softness, is increased by increases of temperature, and, for these reasons, it is preferred that the immersing or other means of contact of the sheeting with the solvent mixture be carried out at temperatures not in excess of 15–20° C.

In order that the treatment with solvent may be uniform over the surfaces of the sheeting, it is desirable that the sheeting, just prior to its entrance into the solvent, be passed between squeezing rolls or otherwise treated to remove or spread any drops of water which it may have carried from the preceding seasoning tray, and, also, that during the passage of the sheeting through the solvent, it be passed into contact with rolls, bars, or other rigid surfaces which serve to distribute any local dilution of water carried on the surface of the sheeting.

Contact of the strained sheeting with the solvent or solvent mixture is continued long enough merely to cause a softening of the surfaces of the sheeting but not long enough to cause softening of the sheet as a whole. Obviously, the time of contact of the sheeting with the solvent or solvent mixture is dependent upon the solvent action of the solvent employed and the particular plastic composition being treated. Other conditions being equal, undiluted solvents will require less time of contact with the sheeting than will the same diluted solvents. While the specific time of contact of the solvent with sheeting of a given composition will necessarily have to be determined on the basis of a few external tests, this will be a routine matter to those skilled in the art in view of the numerous examples hereinafter given. Ordinarily, the duration of contact of the sheeting with the solvent will be in the order of a few seconds.

In accordance with the present invention, this contact with the solvent or solvent mixture is preferably followed by an immersion into, or contact with, a non-solvent liquid for the sheeting which is miscible with the solvent used. Conveniently, the sheeting, if in the usual continuous form, is conducted through the vessel containing the solvent and then immediately passed into a vessel containing water. If, however, the duration of contact with the solvent can be limited by other means such, for example, as by the evaporation of the unused solvent from the surface of the sheeting before the operative duration of the contact is exceeded, then an interval of time may elapse between the treatment with the solvent and the treatment with water. The immediate sequence of these operations is preferable, however, for several reasons; (1) it minimizes the loss of solvent by facilitating its recovery, (2) it minimizes the difficulty which results from the somewhat sticky condition of the sheeting following the solvent treatment, and (3) it minimizes the opportunity of the sheeting to become contaminated by dust as a result of this sticky condition.

In eradicating the tackiness and self-adhesiveness from the surfaces of the sheeting, the contact with water is not essential but merely preferable, and its duration of contact need be no more than very brief. Since, however, contact with water gives an opportunity for the extraction of the solvent and thus provides an economical means for its recovery, the contact with water will ordinarily be prolonged sufficiently to provide for the thorough removal of the solvent.

Because of the somewhat sticky condition of the sheeting entering the water after its treatment with the solvent, it is, at this point, particularly likely to pick up and retain contamination, and additional precautions should be exercised to avoid such contamination. The use of distilled water may be desirable at this point even though it is not employed elsewhere in the process of manufacturing the sheeting.

The process of the invention will generally be applied as part of the sequence of operation in the manufacture of continuous sheeting by extrusion. So long as the essentials of the process are provided; namely, the treating of the sheeting, while at least the surface layers thereof are under a tensional strain, with a liquid solvent for the sheeting to soften the surfaces thereof, whereby the surfaces of the sheeting are roughened, removing the solvent residue from the surfaces of the sheeting, and drying the sheeting, the eradication of tackiness or self-adhesiveness will be effected regardless of whether or not the solvent treatment is introduced into the sequence of the operations at an early or a late stage; i. e., soon after the formation of the sheeting, late in the process of seasoning, or even after the seasoning treatment has been completed. From the standpoint of economy, however, it will obviously be preferable to introduce the step of treating with solvent at an early stage in the ordinary procedure of seasoning the sheeting so as not to have to carry the sheeting twice through the relatively slow process of removing small contents of solvents.

The tension or constraint against shrinkage is preferably applied immediately or soon after the formation of the sheeting by extrusion and before the sheeting has had much of an opportunity to season.

Except for the superficial extraction of plasticizers which may occur when it is not provided for as hereinbefore described, the process of the present invention does not effect any change in composition of the sheeting. The eradication of the tackiness or the self-adhesiveness of the sheeting is to be attributed to a change effected in the surfaces of the sheeting which results in roughening of the surface or, more precisely expressed, a substantial reduction in the proportion of its area which is capable of making intimate contact with a plane surface. The result of the process of the present invention is thus analogous to that of the treatment with embossing equipment described and claimed in a co-pending application Serial No. 344,703, filed July 10, 1940.

The visible effect of the process of the present invention is a dulling or matting of the surfaces of the sheeting. Under a microscope, a surface treated in accordance with the present invention is found to be microscopically pitted. The pits are ordinarily disposed in a pattern, sometimes faint and sometimes distinct, of lines at right angles to the direction of the tensional force employed as a factor in their creation.

While the present invention broadly contemplates within its scope treating plastic sheeting to effect a substantial reduction in the proportion of its area which is capable of making intimate contact with a plane surface, in its broader aspect the invention provides a process for imparting a microscopic roughness to the surfaces of the sheeting by treating the sheeting, while at least the surface layers thereof are under a tensional strain, with a liquid solvent to soften the surfaces of the sheeting, whereby the surfaces are roughened, removing the solvent residue from the surfaces of the sheeting, and drying the sheeting.

The following examples, wherein all parts are given by weight unless otherwise stated, illustrate specific embodiments of the invention.

Example 1

Sheeting treated in accordance with the present invention is one which, upon completion of the seasoning, has the following composition:

Polyvinyl butyral resin:
  Polyvinyl acetate, 0.5% ⎫
  Polyvinyl alcohol, 19.0% ⎬ 70 parts
  Polyvinyl butyral, 80.5% ⎭
Triethylene glycol di-(2-ethyl butyrate)___ 30 parts The sheeting was produced by the extrusion of a dough from a slit orifice into cold water, and then carried through water baths, for the removal of the solvent, for approximately two hours. During its contact with water, particularly during its initial immersion, the tendency of the sheeting to shrink longitudinally as a result of the extraction of solvent was, in part, resisted by the tension necessary for carrying it along, and a tensional strain was thereby developed in at least its superficial layers.

The sheeting after this seasoning contained approximately 10% of water and ½ to 2 per cent of ethyl alcohol. It was then immersed for 5 seconds in ethyl alcohol 92.4% by weight at 20° C., and then into cold distilled water where it remained for 5 seconds. Seasoning in water was continued for approximately 30 minutes longer, and this was followed by air drying at 65° for one hour.

The finished sheeting has a grainly surface and was non-self-adhesive. Safety glass made from this sheeting exhibits no defects attributable to the treatment in accordance with the invention.

Example 2

Sheeting similar to that disclosed in Example 1 was similarly treated except that methanol was used in the dip tank instead of ethyl alcohol. The resulting sheeting was similar in appearance and behavior.

Example 3

Sheeting similar to that disclosed in Example 1 was similarly treated except that the liquid used in the dip tank was ethyl alcohol of 160 proof (73% by weight) at 20° in which the sheeting was immersed for 6 seconds.

The resulting finished sheeting had a rough surface of finer grain than that of the sheeting of Example 1 and was non-tacky but not entirely non-self-adhesive.

Example 4

The procedure of Example 3 was followed in all respects except that the solvent was made up of:

| | Parts |
|---|---|
| Ethyl alcohol 92.4% by weight | 81.8 |
| Water | 18.2 |
| Triethylene glycol di-(2-ethyl butyrate) | 2.0 |

Example 5

The procedure of Example 3 was followed in all respects except that the dipping solvent was made up of:

| | Parts |
|---|---|
| Ethyl alcohol 92.4% by weight | 70 |
| Water | 30 |
| Triethylene glycol di-(2-ethyl butyrate) | 4 |

Example 6

Sheeting treated in accordance with the present invention is one which, upon completion of seasoning, has the following composition:

| Polyvinyl butyral resin: | |
|---|---|
| Polyvinyl acetate, 0.5% | |
| Polyvinyl alcohol, 19.0% | 69 parts |
| Polyvinyl butyral, 80.5% | |
| Dibutyl sebacate | 31 parts |

This sheeting was prepared and treated as in Example 1 except that the liquid into which it was immersed was ethyl alcohol of 65% strength by weight containing 4% of dibutyl sebacate. The temperature at the time of immersion was 20° C., and the duration of immersion was 6 seconds.

Example 7

Sheeting treated in accordance with the present invention is one which, upon completion of the seasoning, has the following composition:

| Polyvinyl butyral resin: | |
|---|---|
| Polyvinyl acetate, 1.5% | |
| Polyvinyl alcohol, 18.9% | 69 parts |
| Polyvinyl n-butyral, 79.6% | |
| Dibutyl sebacate | 31 parts |

This sheeting produced by the extrusion of a dough from a slit orifice was seasoned for 10 minutes by contact with a large volume of water. The slight tension required to carry the sheeting away from the orifice and through the seasoning equipment restrained its longitudinal shrinkage. After this seasoning, the sheeting was immersed for 2 seconds in a mixture of:

| | Parts |
|---|---|
| Ethyl alcohol, 92.4% by weight | 80 |
| Water | 20 |
| Dibutyl sebacate | 3 | and then into distilled water. Thereafter it was further seasoned by contact with water for 2½ hours and then dried in air at 65° C. for 1 hour.

As solvent for the treatment of such sheeting, there may be used ethyl alcohol, methyl alcohol, dioxan, methyl "Cellosolve," methyl acetate and mixtures thereof, preferably in admixture with water. The proportion of water in such mixtures is preferably between about 10 and 30% of the total. It is further preferred, as hereinbefore mentioned, to add to the solvent or solvent mixtures the same plasticizer which is contained in the sheeting in such a proportion that extraction of the latter will be reduced or prevented.

While contact of the sheeting with a solvent or solvent mixture is preferably followed by an immersion in a non-solvent for the sheeting which is miscible with the solvent employed, such treatment is not an essential limitation to the present invention. Other means for nullifying the effect of the solvent on the sheeting may be employed. For example, the active, unused solvent may be evaporated from the sheeting before the solvent has penetrated below the surface layers of the sheeting. In those instances where the solvent action is eliminated by an immersion of the sheeting in a liquid which is a non-solvent for the sheeting but which is miscible with the solvent, any well-known liquid such, for example, as cold water, may be used. While the duration of contact with the water need be only brief, it is desirable, especially where the sheeting was not fully seasoned, to allow the sheeting to remain in contact with the water sufficiently long to provide for the thorough removal of the solvent.

Drying as a final step in the manufacture of the sheeting may be accomplished by any means known to those skilled in the art. Sheeting of the type herein disclosed is generally allowed to dry in air at 65° C. for about one hour.

The process of the present invention solves in a very simple manner the problem of overcoming the self-adhesiveness or tackiness which characterizes compositions of polyvinyl acetal resins and plasticizers therefor which are particularly valuable for the preparation of interlayers of safety glass. The undesirable quality of the surfaces of such sheeting is effectively eradicated with corresponding benefits and economies in the handling, packing, storing, and shipping of such sheeting with glass as a step in the manufacture of safety glass. The body transparency of the interlayer is not impaired nor is its ability to be bonded firmly and permanently to the glass.

As many apparently widely different embodiments of the invention may be made without departing from the spirit and scope thereof; it is to be understood that the invention is not limited to the specific embodiments thereof except as defined in the appended claims.

I claim:

1. Process of reducing the adhesiveness of the surfaces of smooth and pliable adhesive organic plastic sheeting comprising a polyvinyl acetal resin and a plasticizer therefor, which comprises treating the sheeting, while at least the surface layers thereof are under tensional strain, with a liquid solvent for the sheeting to soften the surfaces thereof, whereby said surfaces are microscopically pitted, removing the solvent residue from the surfaces of the sheeting before said solvent causes softening of the sheeting as a whole, and drying the sheeting.

2. Process of reducing the adhesiveness of the surfaces of smooth and pliable adhesive organic plastic sheeting comprising a polyvinyl acetal resin and a plasticizer therefor, which comprises treating the sheeting, while at least the surface layers thereof are under a tensional strain, with a liquid solvent for the sheeting to soften the surfaces thereof, whereby the surface layers of the sheeting are microscopically pitted, evaporating the solvent residue from the surfaces of the sheeting before said solvent causes softening of the sheeting as a whole, and drying the sheeting.

3. Process of reducing the adhesiveness of the surfaces of smooth and pliable adhesive organic plastic sheeting comprising a polyvinyl acetal resin and a plasticizer therefor, which comprises treating the sheeting, while at least the surface layers thereof are under a tensional strain, with a liquid solvent for the sheeting to soften the surfaces thereof, whereby the surface layers of the sheeting are microscopically pitted, immersing the sheeting in a liquid bath which is a non-solvent for the sheeting but which is miscible with the solvent to remove the solvent residue from the surfaces of the sheeting before said solvent causes softening of the sheeting as a whole, and drying the sheeting.

4. Process of reducing the adhesiveness of the surfaces of smooth and pliable adhesive organic plastic sheeting comprising a polyvinyl acetal resin and a plasticizer therefor which comprises treating the sheeting, while at least the surface layers thereof are under a tensional strain, created in at least one of its major dimensions, with an aqueous mixture comprising a solvent for the sheeting to soften the surfaces thereof whereby the surfaces of the sheeting are microscopically pitted, bringing the sheeting into contact with an aqueous bath for the sheeting to remove the solvent residue from the surfaces of the sheeting before said solvent causes softening of the sheeting as a whole, and drying the sheeting.

5. Process of reducing the adhesiveness of the surfaces of smooth and pliable adhesive organic plastic sheeting comprising a polyvinyl butyral resin and a plasticizer therefor which comprises treating the sheeting, while at least the surface layers thereof are under a tensional strain, created in at least one of its major dimensions, with an aqueous mixture comprising a solvent and plasticizer for the sheeting to soften the surfaces thereof and prevent substantial extraction of the plasticizer therefrom, whereby the surfaces of the sheeting are microscopically pitted, bringing the sheeting into contact with an aqueous bath to remove the solvent residue from the surfaces of the sheeting before said solvent causes softening of the sheeting as a whole, and drying the sheeting.

PAUL W. CRANE.